INVENTORS
PAUL E. ROCKWELL
DONALD D. CAMERON
BY

INVENTORS
PAUL E. ROCKWELL
DONALD D. CAMERON
BY
Attorney

United States Patent Office 3,499,435
Patented Mar. 10, 1970

3,499,435
ESOPHAGEAL PROBE FOR USE IN MONITORING
Paul E. Rockwell, 38 Belle Ave., Troy, N.Y. 12180, and Donald D. Cameron, Waterford, N.Y., said Cameron assignor to said Rockwell
Filed June 2, 1967, Ser. No. 643,195
Int. Cl. A61b 5/02, 1/26
U.S. Cl. 128—2.05   10 Claims

ABSTRACT OF THE DISCLOSURE

A disposable esophageal probe for use in monitoring, with a conventional stethoscope. Modifications of the esophageal probe of integral one-piece construction include the combination of the esophageal probe and a gastric drainage tube; the combination of the esophageal probe, gastric drainage tube and a temperature probe; the combination of the esophageal probe, gastric drainage tube and electrocardiogram lead; and the combination of the esophageal probe, gastric drainage tube, temperature probe and electrocardiogram lead.

---

This invention relates to a disposable esophageal probe for use with a conventional stethoscope in monitoring.

In many adults, especially those with heavy layers of fat and muscle, but also those with emphysema, the heart sounds are poorly audible through the chest wall with a conventional stethoscope. In such a situation, an esophageal probe connected to the anesthetist's ear by a plastic molded earpiece or to the conventional stethoscope by substitution for its body contact piece and tubing permits continuous monitoring of the heart sounds and the respiratory exchange. Such monitoring is much better than electronic monitoring for the reason that it is not subject to mechanical failure in the operating room as the inventors, as experts in this field of art, have often witnessed in the operating room when electronic monitors were employed. In addition thereto, the quality of the heart sounds to the experienced ear is invaluable, and such continuous heart sound monitoring through the utilization of the esophageal probe of this invention will allow the anesthetist to sense the approach of sudden hypotension or low blood pressure even before the blood pressure is taken; to sense arrhythmia or irregularity of heart beat before it is serious; to sense cardiac arrest or sudden stoppage of heart action exactly when it occurs to thereby afford speedy treatment; and, finally, such monitoring allows the anesthetist to continuously hear the quantity and quality of the respiratory pattern so that he can tell when his relaxants are wearing off, when suction is needed, and, in the situation of emphysema or the swelling or distention caused by air in the interstices of connective tissue and when seen as part of, or in reference to, "chronic pulmonary emphysema," the term signifying an overinflation of the lungs, usually by progressive and persistent obstruction of the tubular air system (the bronchi) leading to overdistension of the alveoli (air sacs), destruction of the elastic fibers within the alveolar walls and of many partitions dividing the alveoli, and various debilitating disturbances of lung function, such monitoring can be lifesaving in the prevention of "air-trapping." And many times in the practice of anesthesiology and/or intensive care procedures the need arises for the employment and use of both a gastric drainage tube and an esophageal probe. Since the insertion of two tubes in the esophagus is not only difficult, but also uncomfortable to the patient and hazardous, it is proposed by this invention to combine the two tubes into one tube with the performance of their separate and distinct functions. The combined double-lumen tube would be smaller than the total cross-sectional area of the separate tubes and would reduce considerably the hazard attendant upon the introduction of two separate tubes. In this connection it should be noted that the double-lumen tube would be only approximately 40% greater in cross-sectional area than the total cross-sectional area of the two tubes if used separately.

Although the number of deaths due to sudden hyperpyrexia or excess temperature is rising to alarming proportions in this country today, and is the cause of one of the major operating room accidents today, nevertheless, continuous esophageal temperature monitoring is practically not employed in the average hospital. With the combined esophageal, stethoscopic probe, gastric drainage tube and temperature probe of this invention, the great advantage of such combination is that all three can be introduced as one with little significant increase in the cross-sectional area in comparison to the cross-sectional area generated by the esophageal, stethoscopic probe by itself or in comparison to the cross-sectional area generated by the gastric drainage tube by itself or in comparison to the cross-sectional area generated by the stiff, blunt tube needed for the temperature probe for such introduction. The utilization of the three combined probes will contribute materially to the proper care of the surgical case both in the operating room and in the recovery room.

Further in this connection it should be appreciated that with a very ill patient in the operating room and under intensive care it would be to the best interests of such patient to further incorporate with the combined esophageal, stethoscopic probe and gastric drainage tube an electrocardiogram lead to faciltate esophageal electrocardiography.

This discussion of the problems of the prior art points up the needs and objects of this invention of solving these discussed problems by providing a disposable esophageal probe that can be substituted for the body contact piece and tubing of the conventional stethoscope to establish communicative relationship therewith for continuous monitoring of the heart sounds and respiratory exchange after introduction of such esophageal probe; by providing the combination of an esophageal probe and a gastric drainage tube to achieve their respective functions; by providing the combination of an esophageal probe, gastric drainage tube and temperature probe to achieve their respective functions; by providing the combination of an esophageal probe, gastric drainage tube and an electrocardiogram lead to achieve their respective functions; and by providing the combination of an esophageal probe, gastric drainage tube, temperature probe and electrocardiogram lead to achieve their respective functions.

These objects and other objects of the invention should be discerned and appreciated from the detailed specification taken in conjunction with the drawings, wherein like reference numerals refer to similar parts throughout the several views, in which.

Figure 1:
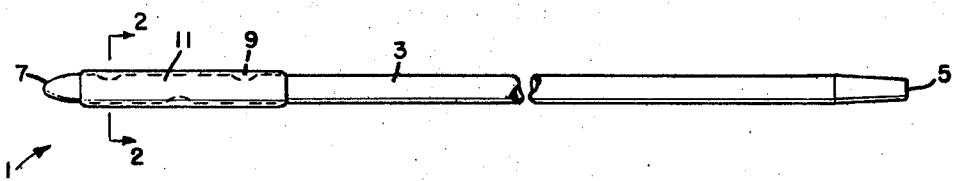
FIG. 1 is a view of the disposable esophageal probe of the invention.
Figure 2:
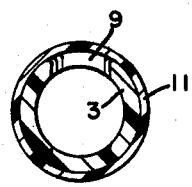
FIG. 2 is a sectional view taken along the line 2—2 of FIG. 1.

In FIGS. 1 and 2 of the drawings, reference numeral 1 generally refers to the disposable esophageal probe of this invention. Esophageal probe 1 comprises a tube 3 preferably of polyvinyl chloride plastic material, circular in cross-section, and having an open end 5 and a blunted, closed end 7, as shown. In place of the conventional sound pickup or body piece disposed to communicate by its tubing with the conventional stethoscope proper, the tube 3 is substituted therefor with its open end 5 disposed in such communicative relationship with the conventional stethoscope. Formed through tube 3 in the region adjacent its closed end 7 are several sound-admitting holes 9 covered by a thin diaphragm 11, as shown. Diaphragm 11 is likewise of polyvinyl chloride plastic material.

Figure 3:
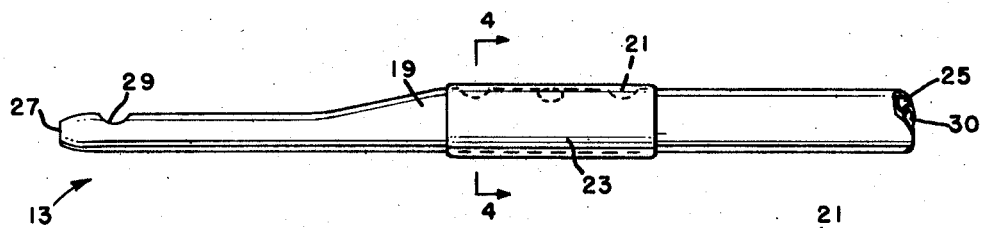
FIG. 3 is a view of the esophageal probe and gastric drainage tube.
Figure 4:
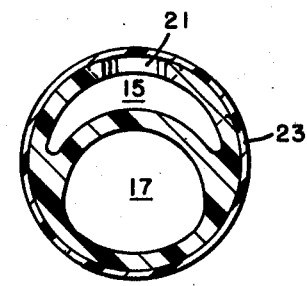
FIG. 4 is a sectional view taken along the line 4—4 of FIG. 3.

In FIGS. 3 and 4 of the drawings, reference numeral 13 generally refers to the modification of the combined esophageal probe and gastric drainage tube preferably of polyvinyl chloride plastic material. The esophageal-probe-tube lumen 15, in cross-section, is generally in the configuration of a circular segment, as shown. The gastric-drainage-tube lumen, in cross-section, is generally in the configuration of an ellipse, as shown. Lumens 15 and 17 are of one-piece, integral construction and do not communicate with each other.

Lumen 15 terminates in the region 19. Sound-admitting holes 21 are formed through lumen 15, as shown, and are covered by a thin diaphragm 23, preferably of polyvinyl chloride plastic material, and which diaphragm 23 covers both lumens 15 and 17 which together are circular in cross-section. Lumen 15 has an open end 25 for dispositive communication with the conventional stethoscope similar to the communicative relationship the open end 5 of tube 3 establishes.

Lumen 17 has a terminal open end 27 with a hole 29 formed through lumen 17 in the region of open end 27. Lumen 17 further has an open end 30 for communication with a gastric drainage pump or for free drainage for the removal of stomach fluids including liquids and gas.

Figure 5:
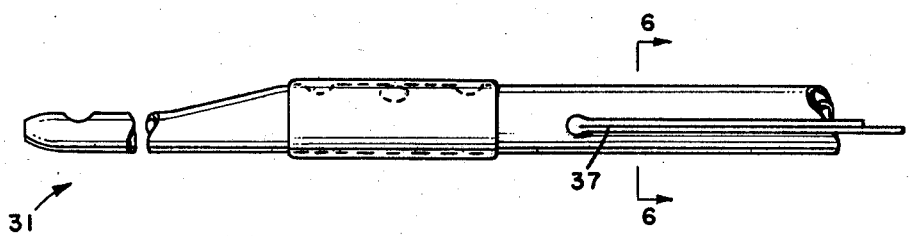
FIG. 5 is a view of the combined esophageal probe, gastric drainage tube and temperature probe.
Figure 6:
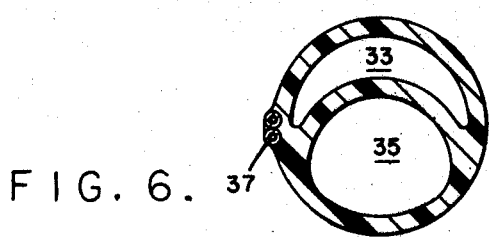
FIG. 6 is a sectional view taken along the line 6—6 of FIG. 5.

In FIGS. 5 and 6 of the drawings, reference numeral 31 generally refers to the modification of the combined esophageal probe, gastric drainage tube and temperature probe. The esophageal probe 33 and gastric drainage tube 35 are similar to the respective esophageal probe 15 and gastric drainage tube 17 described in FIGS. 3 and 4. In this modification a conventional temperature probe 37 is formed integral with the esophageal probe 33 and gastric drainage tube 35.

Figure 7:
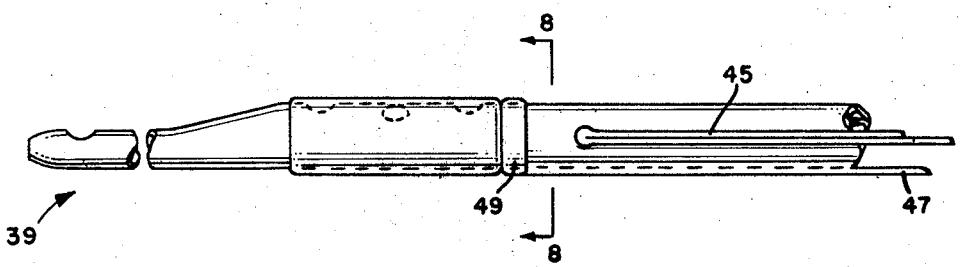
FIG. 7 is a view of the combined esophageal probe, gastric drainage tube, temperature probe and electrocardiogram lead.
Figure 8:
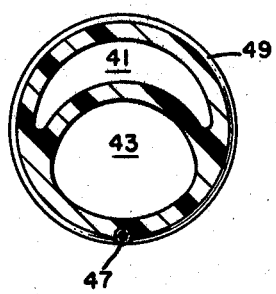
FIG. 8 is a sectional view taken along the line 8—8 of FIG. 7.

In FIGS. 7 and 8 of the drawings, reference numeral 39 generally refers to the modification of the combined esophageal probe 41, gastric drainage tube 43, temperature probe 45 and electrocardiogram lead (hereinafter referred to as "ECG lead") 47. The esophageal probe 41, gastric drainage tube 43 and temperature probe 45 are similar to the respective esophageal probe 33, gastric drainage tube 35 and temperature probe 37 described in FIGS. 5 and 6. The ECG lead 47 is a nickel-silver or platinum electrode embedded in the polyvinyl chloride plastic of the gastric drainage tube 43, as shown. The ECG lead 47 is in electrical contact wtih a band or ring 49 of similar nickel-silver or platinum material. Band or ring 49 is carried on the exterior surface of esophageal probe 41 and gastric drainage tube 43, as shown.

A further modification would be a combined esophageal probe, gastric drainage tube and ECG lead. Such modification would be similar to that shown in FIGS. 7 and 8 with the exception that the temperature probe 45 would not be shown. With this noted exception, the description of the combined esophageal probe, gastric drainage tube and ECG lead would be similar to the description afforded the respective esophageal probe 41, gastric drainage tube 43 and ECG lead 47 in FIGS. 7 and 8.

The esophageal probe by itself or in its modified combinations is inserted with or without an anesthetic either through the nose, nasopharynx, oropharynx and into the esophagus, or through the mouth, oropharynx and into the esophagus.

In the embodiments of the invention described it should be appreciated that the esophageal probe is utilized to monitor heart sounds and respiratory exchange by connecting its open end to the molded earpiece or to the conventional stethoscope. And in this connection the gastric drainage tube is utilized for free drainage or in communication with a gastric drainage pump for the removal of stomach fluids including liquids and gas. Likewise the temperature probe is utilized with conventional equipment to monitor temperature. And finally the ECG lead is utilized with an electrocardiograph for purposes of electrocardiography.

Having thusly described our invention, we claim:

1. An esophageal probe for use with a conventional stethoscope or earpiece in monitoring of the heart sounds and the respiratory exchange; said probe comprising a tube and a diaphragm, said tube having a closed end and an open end, said tube having sound-admitting holes formed therethrough, said diaphragm covering said sound-admitting holes.

2. An esophageal probe in accordance with claim 1, wherein said tube and diaphragm are made of polyvinyl chloride plastic material.

3. An esophageal probe in accordance with claim 1, wherein said esophageal probe comprises in combination therewith a gastric drainage tube for the removal of stomach fluids, and wherein said esophageal probe and gastric drainage tube are of one-piece, integral construction.

4. An esophageal probe in accordance with claim 1, wherein said esophageal probe comprises in combination therewith a gastric drainage tube for the removal of stomach fluids and a temperature probe for temperature monitoring, and wherein said esophageal probe, gastric drainage tube and temperature probe are of one-piece, integral construction.

5. An esophageal probe in accordance with claim 1, wherein said esophageal probe comprises in combination therewith a gastric drainage tube for the removal of stomach fluids and an ECG lead for electrocardiography, and wherein said esophageal probe, gastric drainage tube and ECG lead are of one-piece, integral construction.

6. An esophageal probe in accordance with claim 1, wherein said esophageal probe comprises in combination therewith a gastric drainage tube for the removal of stomach fluids, a temperature probe for temperature monitoring and an ECG lead for electrocardiography, and wherein said esophageal probe, gastric drainage tube, temperature probe and ECG lead are of one-piece, integral construction.

7. An esophageal probe in accordance with claim 3, wherein said esophageal probe and gastric drainage tube are made of polyvinyl chloride plastic material.

8. An esophageal probe in accordance with claim 4, wherein said esophageal probe and gastric drainage tube are made of polyvinyl chloride plastic material.

9. An esophageal probe in accordance with claim 5, wherein said esophageal probe and gastric drainage tube are made of polyvinyl chloride plastic material.

10. An esophageal probe in accordance with claim 6, wherein said esophageal probe and gastric drainage tube are made of polyvinyl chloride plastic material.

References Cited

UNITED STATES PATENTS

| | | | |
|---|---|---|---|
| 883,583 | 3/1908 | Stallsmith | 128—240 |
| 2,750,938 | 6/1956 | Bier | 128—2 |
| 2,816,997 | 12/1957 | Conrad | 128—2 |
| 2,930,377 | 3/1960 | Cowley | 128—344 |
| 2,949,910 | 8/1960 | Brown et al. | 128—2.05 |
| 3,363,629 | 1/1968 | Kuhn | 128—351 |
| 3,411,507 | 11/1968 | Wingrove | 128—422 |

FOREIGN PATENTS 15,864  7/1912  France.
(Addition to 439,636)

OTHER REFERENCES

Lancet, vol. 1, #7330, p. 416.

DALTON L. TRULUCK, Primary Examiner

U.S. Cl. X.R.

128—351; 181—24